(12) United States Patent
Sandhu et al.

(10) Patent No.: US 11,443,378 B2
(45) Date of Patent: Sep. 13, 2022

(54) METHODS AND APPARATUS FOR GENERATING AND OPERATING A SWAPS TRADING PLATFORM

(71) Applicant: INTEGRAL DEVELOPMENT CORPORATION, Palo Alto, CA (US)

(72) Inventors: Harpal Sandhu, Palo Alto, CA (US); Michelle Yip Chen, San Mateo, CA (US); Vikas Srivastava, Palo Alto, CA (US)

(73) Assignee: INTEGRAL DEVELOPMENT, INC., Palo Alto, CA (US)

( * ) Notice: Subject to any disclaimer, the term of this patent is extended or adjusted under 35 U.S.C. 154(b) by 0 days.

(21) Appl. No.: 17/065,496

(22) Filed: Oct. 7, 2020

(65) Prior Publication Data

US 2021/0027372 A1  Jan. 28, 2021

Related U.S. Application Data

(62) Division of application No. 14/214,035, filed on Mar. 14, 2014, now Pat. No. 10,915,951.

(60) Provisional application No. 61/794,585, filed on Mar. 15, 2013.

(51) Int. Cl.
*G06Q 40/04* (2012.01)
(52) U.S. Cl.
CPC .................................. *G06Q 40/04* (2013.01)
(58) Field of Classification Search
CPC ............................................. G06Q 40/04
USPC ............................................................ 705/37
See application file for complete search history.

(56) References Cited

U.S. PATENT DOCUMENTS

| | | |
|---|---|---|
| 2004/0148247 A1 | 7/2004 | Miller et al. |
| 2004/0181474 A1* | 9/2004 | Grubb .................... G06Q 40/00 705/35 |
| 2010/0312689 A1 | 12/2010 | Bauerschmidt et al. |
| 2011/0047060 A1 | 2/2011 | Borden et al. |
| 2012/0310809 A1 | 12/2012 | Wilson, Jr. et al. |
| 2013/0041802 A1 | 2/2013 | Co et al. |
| 2014/0279365 A1* | 9/2014 | Srivastava ............. G06Q 40/04 705/37 |
| 2014/0289091 A1* | 9/2014 | Srivastava ............. G06Q 40/04 705/37 |

(Continued)

OTHER PUBLICATIONS

Non Final Office Action received for U.S. Appl. No. 14/214,035 dated Apr. 13, 2016, 12 pages.

(Continued)

*Primary Examiner* — Lindsay M Maguire
(74) *Attorney, Agent, or Firm* — Artegis Law Group, LLP

(57) ABSTRACT

In various embodiments, methods and apparatuses for generating and operating a swaps execution facility (SEP) compliant swaps trading platform comprises (i) generating a swaps trading platform, where the generated swaps trading platform is configured to operate in accordance with a plurality of predefined rules associated with swaps execution facility (SEP) requirements; (ii) establishing one or more communication channels with respective one or more clearinghouses for transmission of clearinghouse information concerning one or more trade requests; and (iii) establishing one or more communication channels with respective one or more swaps data repository (SDR) providers for transmission of SDR information concerning the one or more trade requests.

12 Claims, 11 Drawing Sheets

(56) References Cited

U.S. PATENT DOCUMENTS

2015/0363752 A1* 12/2015 Kimberg ............... G06Q 20/10
                                                                  705/39

OTHER PUBLICATIONS

Final Office Action received for U.S. Appl. No. 14/214,035 dated Aug. 4, 2016, 16 pages.
Non Final Office Action received for U.S. Appl. No. 14/214,035 dated Jan. 4, 2017, 11 pages.
Final Office Action received for U.S. Appl. No. 14/214,035 dated Apr. 25, 2017, 10 pages.
Non Final Office Action received for U.S. Appl. No. 14/214,035 dated Sep. 26, 2017, 12 pages.
Final Office Action received for U.S. Appl. No. 14/214,035 dated Feb. 20, 2018, 15 pages.
Notice of Allowance received for U.S. Appl. No. 14/214,035 dated Jun. 22, 2020, 8 pages.
Notice of Allowance received for U.S. Appl. No. 14/214,035 dated Oct. 2, 2020, 10 pages.
Corrected Notice of Allowance received for U.S. Appl. No. 14/214,035 dated Oct. 6, 2020, 4 pages.
Non Final Office Action received for U.S. Appl. No. 17/065,485 dated Sep. 22, 2021, 15 pages.
Final Office Action received for U.S. Appl. No. 17/065,485 dated Feb. 7, 2022, 13 pages.
International Search Report for application No. PCT/US2014/029576 dated Sep. 15, 2015.
Restriction Requirement received for U.S. Appl. No. 14/214,035 dated Oct. 26, 2015, 15 pages.
Notice of Allowance received for U.S. Appl. No. 17/065,485 dated Jun. 15, 2022, 14 pages.

* cited by examiner

METHODS AND APPARATUS FOR GENERATING AND OPERATING A SWAPS TRADING PLATFORM

CROSS-REFERENCE TO RELATED APPLICATIONS

This application is a divisional of co-pending U.S. patent application titled, "Method and Apparatus for Generating and Operating A Swaps Trading Platform," filed Mar. 14, 2014 and having Ser. No. 14/214,035, which claims the benefit of U.S. provisional patent application titled, "Method, System, and Apparatus for Generating and Operating A Swaps Trading Platform," filed Mar. 15, 2013 and having Ser. No. 61/794,585. The subject matter of these related applications is hereby incorporated herein by reference.

BACKGROUND OF THE INVENTION

Field of the Invention

The instant disclosure relates generally to the trading of financial instruments and, more specifically, to methods and apparatuses for generating and operating one or more swaps trading platforms.

The Dodd-Frank Wall Street Reform and Consumer Protection Act ("Dodd-Frank") (Pub.L. 111-203, H.R. 4173) was signed into federal law by President Barack Obama on Jul. 21, 2010. Passed as a response to the late-2000s recession, it brought the most significant changes to financial regulation in the United States since the regulatory reform that followed the Great Depression. Dodd-Frank enacted changes in the American financial regulatory environment that affect all federal financial regulatory agencies and almost every part of the nation's financial services industry.

One particular aspect of Dodd-Frank focuses on the regulation of swap trading. As known in the art, a "swap" is the exchange of one asset or liability for a similar asset or liability for the purpose of lengthening or shortening maturities, or raising or lowering coupon rates, to maximize revenue or minimize financing costs. Title VII of the Dodd-Frank Act regulates swap trading. Specifically, Title VII requires that (i) swaps subject to the clearing requirements of Section 2(h)(I) of the Commodity Exchange Act ("CEA") be executed either on a Designated Contract Market ("DCM") or on a Swap Execution Facility ("SEP"), unless no DCM or SEP made the swap "available for trading" and (ii) no person may operate a facility for the trading or processing of swaps unless the facility is registered as a SEP or as a DCM. As known in the art, a SEP is a regulated platform for swap trading that provides pre-trade information (e.g., bids and offers) and an execution mechanism for swap transactions among eligible participants.

Additionally, the U.S. Treasury Department has exempted foreign exchange ("FX" or "forex") swaps and forwards from the Dodd-Frank regulations, although the reporting requirements set forth in Dodd-Frank continue to apply to the trading of these instruments. Further, FX non-deliverable forwards still need to be traded on a SEP and cleared. Further still, FX options may eventually require SEP trading as well.

The Dodd-Frank regulations are expected to greatly impact entities and institutions involved in swap trading. For example, most customers will not be allowed to trade non-deliverable forwards (NDFs) bilaterally, including single-dealer platforms, although, some customers may qualify for end-user exemption. Additional issues facing customers include: (i) the need to become a SEP member; (ii) the need to connect to clearing houses via clearing members; (iii) collateral requirements; and (iv) the need to know and comply with SEP rules under Dodd-Frank.

Banks are also expected to be greatly affected by Dodd-Frank. One exemplary issue that Dodd-Frank creates for banks is migration risk due to customers' strong preference to limit the number of trading venues that they employ. Currently, banks do not have trading platforms that are SEP compliant. Accordingly, when customers want to trade instruments that need to go through a SEP compliant platform, they need to leave the bank's platform. The hassle associated with jumping back and forth between several different platforms causes many customers to simply stop using banks' trading platforms altogether. Accordingly, it would be desirable to create an intuitive interface between a banks' trading platform and a SEP compliant platform, such that customers could quickly and seamlessly transition back and forth between the disparate platforms without undue hardship.

In addition, banks could lose out on the profitable NDF and options business, as well as spot, forwards, and swaps business to SEFs offering a complete product set. Additional issues affecting banks under Dodd-Frank include: (i) the need to become a SEP member; (ii) the need to connect to clearing houses via clearing members; (iii) collateral requirements; and (iv) the need to know and comply with SEP rules under Dodd-Frank.

Accordingly, new methods and apparatuses aimed at alleviating the drawbacks of conventional swaps trading platforms are desired.

SUMMARY OF THE INVENTION

The instant disclosure describes methods and apparatuses for, among other things, generating and operating a swaps trading platform that is SEP compliant. To this end, in one example, a computer-implemented method for generating a SEP compliant trading platform is provided. The method may include: (i) generating a swaps trading platform, wherein the generated swaps trading platform is configured to operate in accordance with a plurality of predefined rules associated with swaps execution facility (SEP) requirements; (ii) establishing one or more communication channels with respective one or more clearinghouses for the transmission of clearinghouse information concerning one or more trade requests; and (iii) establishing one or more communication channels with respective one or more swaps data repository (SDR) providers for the transmission of SDR information concerning the one or more trade requests.

In another example of the foregoing method, the method may additionally include obtaining the one or more trade requests and executing the one or more trade requests in accordance with the plurality of predefined rules associated with the SEP requirements. In one example, the method may further include: (i) transmitting the clearinghouse information concerning the one or more executed trade requests with one or more clearinghouses via the one or more communication channels with the respective one or more clearinghouses and/or (ii) transmitting the SDR information concerning the one or more executed trade requests with one or more SDR providers via the one or more communication channels with the respective one or more SDR providers.

In still another example, the step of generating the swaps trading platform may include embedding a selectable non-SEP compliant portal in the swaps trading platform. In this example, the method may also include the steps of: (i) obtaining selection information selecting the selectable non-SEP complaint portal and (ii) transitioning from the generated swaps trading platform to a non-SEP compliant swaps trading platform based on the selection of the selectable non-SEP compliant portal.

In one example, the plurality of predefined rules associated with the SEP requirements are associated with one or more of the following: (i) market snapshot at execution; (ii) mid-mark; (iii) counterparty legal entity identifier (LEI); and/or (iv) unique swaps identifier (USI). In another example, the trade-type requiring execution in the SEP includes one or more of the following: (i) a non-deliverable forward (NDP) and/or (ii) a foreign exchange option.

In another example, a computer-implemented method for operating a SEP compliant swaps trading platform is provided. In this example, the method may include: (i) obtaining one or more trade requests, wherein the one or more trade requests concerns a trade-type requiring execution in a swaps execution facility (SEP); (ii) executing the one or more trade requests in accordance with a plurality of predefined rules associated with SEP requirements; (iii) communicating clearinghouse information regarding the executed one or more trade requests with one or more clearinghouses; and (iv) communicating swaps data repository (SDR) information regarding the executed one or more trade requests with one or more SDR providers for storage in a SDR.

In still another example, a method of embedding portals in both a SEP compliant platform and a non-SEP compliant platform is provided. In this example, the method may include (i) embedding a selectable non-SEP compliant portal in a first swaps trading platform, wherein the first swaps trading platform is configured to operate in accordance with a plurality of predefined rules associated with swaps execution facility (SEP) requirements and (ii) embedding a selectable SEP compliant portal in a second swaps trading platform, wherein the second swaps trading platform is not configured to operate in accordance with the plurality of predefined rules associated with the SEP requirements. As used herein, "embedding" may include, for example, generating a simple, intuitive, selectable interface allowing customers to jump back and forth from the non-SEP compliant platform to the SEP compliant platform. In one example, such an interface could comprise a radio button embedded in a non-SEP compliant platform (e.g., webpage). In this example, when a user clicks the radio button (which could be labeled, for example, "SEP") on a non-SEP compliant platform, they are transferred to a SEP compliant platform in near real-time. Similarly, the present disclosure includes embedding a separate interface in a SEP compliant platform which a user could select to be transferred to a non-SEP compliant platform. In this manner, users may switch back and forth between non-SEP compliant and SEP compliant platforms efficiently without the need to partake in intervening steps of, for example, logging out of the non-SEP compliant platform, opening the SEP compliant platform, logging into the SEP compliant platform, and then trading.

BRIEF DESCRIPTION OF THE FIGURES

Reference will now be made to the accompanying figures and flow diagrams, which are not necessarily drawn to scale, and wherein.

DETAILED DESCRIPTION

Figure 1:
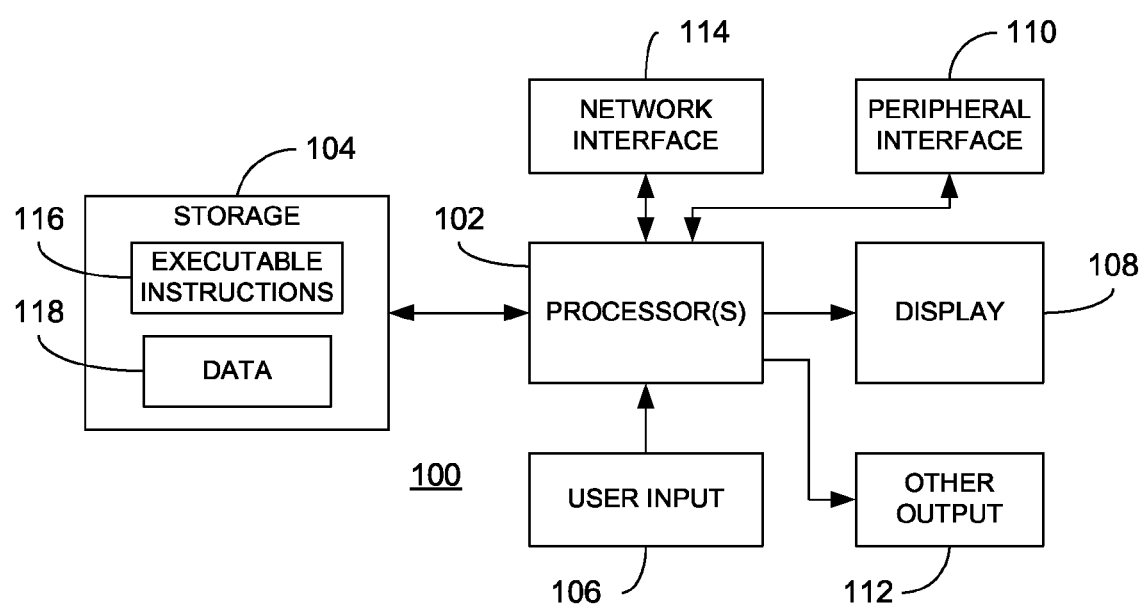
FIG. 1 is a block diagram illustrating one example of a computing device suitable for use in carrying out the techniques described in this disclosure.

To facilitate an understanding of the principals and features of the disclosed technology, illustrative embodiments are explained below. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It must also be noted that, as used in the specification and the appended claims, the singular forms "a," "an" and "the" include plural referents unless the context clearly dictates otherwise.

Ranges may be expressed herein as from "about," "substantially," "approximately" one particular value and/or to "about," "substantially," or "approximately" another particular value. When such a range is expressed, another embodiment includes from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the disclosed technology provide methods and apparatuses for generating and operating a SEP compliant trading platform. The method may include: (i) generating a swaps trading platform, wherein the generated swaps trading platform is configured to operate in accordance with a plurality of predefined rules associated with swaps execution facility (SEP) requirements; (ii) establishing one or more communication channels with respective one or more clearinghouses for the transmission of clearinghouse information concerning one or more trade requests; and (iii) establishing one or more communication channels with respective one or more swaps data repository (SDR) providers for the transmission of SDR information concerning the one or more trade requests.

In another example embodiment, a computer program product embodied in a non-transitory computer-readable medium comprising an algorithm adapted to effectuate a method is provided. The method may include (i) generating a swaps trading platform, wherein the generated swaps trading platform is configured to operate in accordance with a plurality of predefined rules associated with swaps execution facility (SEP) requirements; establishing one or more communication channels with respective one or more clearinghouses for the transmission of clearinghouse information concerning one or more trade requests; and (iii) establishing one or more communication channels with respective one or more swaps data repository (SDR) providers for the transmission of SDR information concerning the one or more trade requests.

Referring now to the Figures, in which like reference numerals represent like parts, various embodiments of the computing devices and methods will be disclosed in detail. FIG. 1 is a block diagram illustrating one example of a computing device 100 suitable for use in carrying out the techniques described herein.

FIG. 1 illustrates a representative computing device 100 that may be used to implement the teachings of the instant disclosure. The device 100 may be used to implement, for example, one or more components of the system shown in FIGS. 2-4, as described in greater detail below. The device 100 includes one or more processors 102 operatively connected to a storage component 104. The storage component 104, in turn, includes stored executable instructions 116 and data 118. In an embodiment, the processor(s) 102 may include one or more of a microprocessor, microcontroller, digital signal processor, co-processor or the like or combinations thereof capable of executing the stored instructions 116 and operating upon the stored data 118. Likewise, the storage component 104 may include one or more devices such as volatile or nonvolatile memory including but not limited to random access memory (RAM) or read only memory (ROM). Further still, the storage component 104 may be embodied in a variety of forms, such as a hard drive, optical disc drive, floppy disc drive, flash memory, etc. Processor and storage arrangements of the types illustrated in FIG. 1 are well known to those having ordinary skill in the art. In one embodiment, the processing techniques described herein are implemented as a combination of executable instructions and data within the storage component 104.

As shown, the computing device 100 may include one or more user input devices 106, a display 108, a peripheral interface 110, other output devices 112, and a network interface 114 in communication with the processor(s) 102. The user input device 106 may include any mechanism for providing user input to the processor(s) 102. For example, the user input device 106 may include a keyboard, a mouse, a touch screen, microphone and suitable voice recognition application, or any other means whereby a user of the device 100 may provide input data to the processor(s) 102. The display 108 may include any conventional display mechanism such as a cathode ray tube (CRT), flat panel display, or any other display mechanism known to those having ordinary skill in the art. In an embodiment, the display 108, in conjunction with suitable stored instructions 116, may be used to implement a graphical user interface. Implementation of a graphical user interface in this manner is well known to those having ordinary skill in the art. The peripheral interface 110 may include the hardware, firmware and/or software necessary for communication with various peripheral devices, such as media drives (e.g., magnetic disk or optical disk drives), other processing devices, or any other input source used in connection with the instant techniques. Likewise, the other output device(s) 112 may optionally include similar media drive mechanisms, other processing devices, or other output destinations capable of providing information to a user of the device 100, such as speakers, LEDs, tactile outputs, etc. Finally, the network interface 114 may include hardware, firmware, and/or software that allows the processor(s) 102 to communicate with other devices via wired or wireless networks, whether local or wide area, private or public, as known in the art. For example, such networks may include the World Wide Web or Internet, or private enterprise networks, as known in the art.

While the computing device 100 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the device 100 may include a greater or lesser number of components than those illustrated. Once again, those of ordinary skill in the art will appreciate the wide number of variations that may be used is this manner. Further still, although a single computing device 100 is illustrated in FIG. 1, it is understood that a combination of such computing devices may be configured to operate in conjunction (for example, using known networking techniques) to implement the teachings of the instant disclosure.

Figure 2:
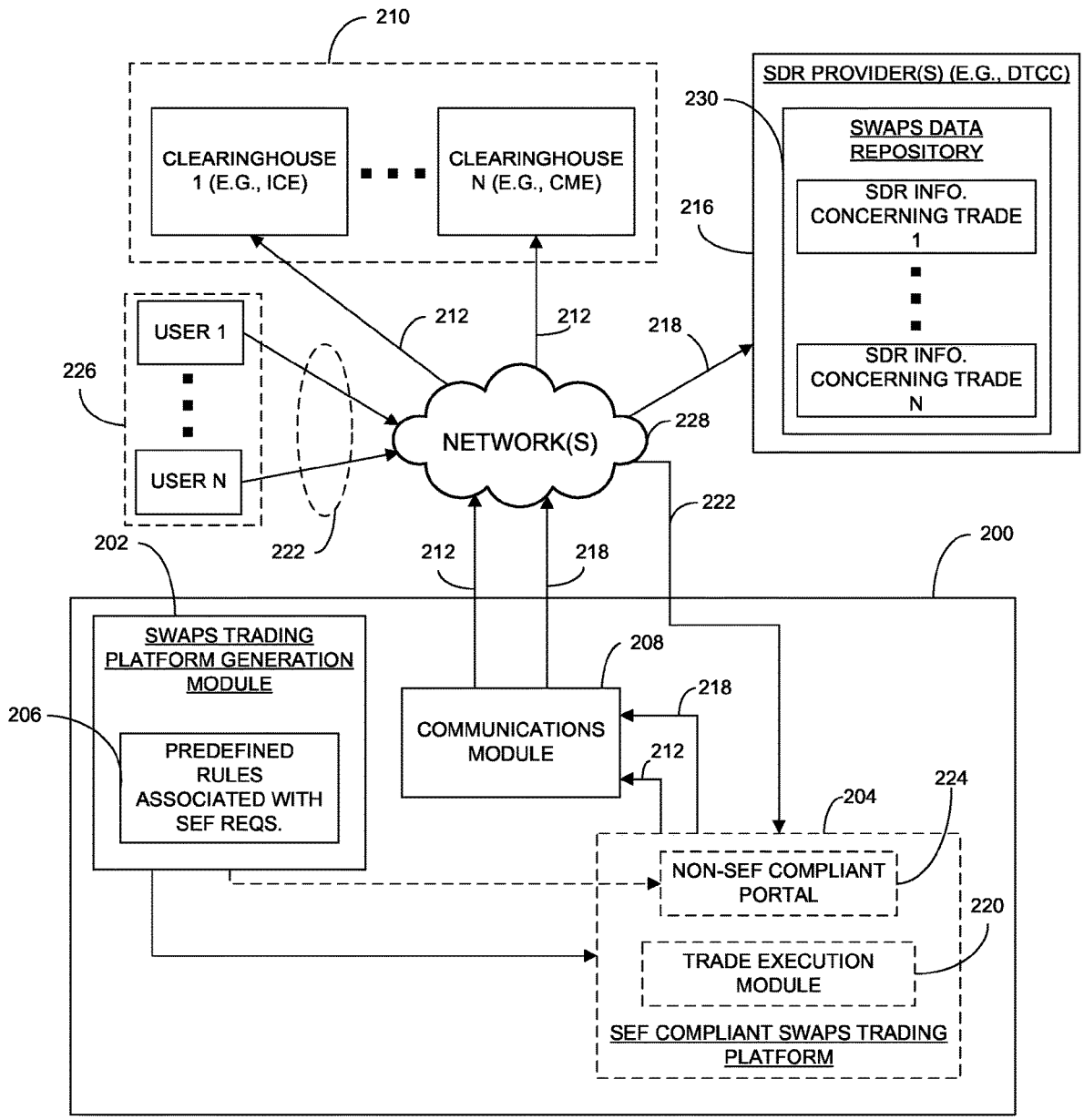
FIG. 2 is a block diagram illustrating one example of an apparatus suitable for use m generating and operating a SEP compliant swaps trading platform within a network environment.

FIG. 2 is a block diagram illustrating one example of an apparatus 200 suitable for use in generating and operating a SEP compliant swaps trading platform within a network environment s provided. The apparatus 200 may be implemented by, for example, the computing device 100 described above, or using other suitable computing techniques and components known to those having ordinary skill in the art. In one example, the apparatus 200 includes a swaps trading platform generation module 202 and a communications module 208. In one example, the apparatus 200 may additionally include a swaps execution facility (SEP) compliant swaps trading platform 204 in line with the discussion that follows.

The apparatus 200 may be communicatively coupled to one or more of the following over one or more suitable wired or wireless networks 228 (e.g., the Internet): (i) one or more users 226; (ii) one or more clearinghouses 210; and/or (iii) one or more swaps data repository (SDR) providers 216. The one or more users 226 may include, for example, banks, brokers, asset managers, hedge funds, individual investors, or any other person or entity interested in trading the types of financial instruments requiring execution in a SEP under the Dodd-Frank regulatory scheme. The one or more clearinghouses 210 may include, but are not limited to, (i) one or more clearinghouses operated by the Intercontinental Exchange Group, Inc. (ICE), (ii) one or more clearinghouses operated by the Chicago Mercantile Exchange (CME), and/or (iii) any other suitable clearinghouse(s) known to those having ordinary skill in the art. The one or more SDR providers 216 may include, but are not limited to, The Depository Trust & Clearing Corporation (DTCC), or any other suitable swaps data repository provider known to those having ordinary skill in the art.

In operation, the apparatus 200 may function as follows. The swaps trading platform generation module 202 of the apparatus 200 is configured to generate a swaps trading platform (e.g., SEP compliant swaps trading platform 204) based on predefined rules associated with SEP requirements 206. As known in the art, a SEP is a regulated platform for swap trading that provides pre-trade information (e.g., bids and offers) and an execution mechanism for swap transactions among eligible participants (e.g., user(s) 226). Thus, the swaps trading platform generation module 202 of the apparatus 200 is operative to generate a SEP platform (e.g., SEP compliant swaps trading platform 204) that operates in accordance with the regulatory requirements of, for example, the Dodd-Frank Act.

The predefined rules associated with the SEP requirements 206 may be associated with one or more of the following types of information that are required for a SEP compliant trading platform under the Dodd-Frank regulatory scheme: (i) market snapshot at execution; (ii) mid-mark; (iii) counterparty legal entity identifier (LEI); and/or unique Swap identifier (USI). Market snapshot at execution information may include, for example, information representing all market quotes made available to one or more liquidity takers (e.g., user(s) 226) following invocation of price discovery through a Request-for-Quote (RFQ) practice. Mid-mark information may include, for example, information representing one or more mid-points in price between respective one or more bids and offers. Mid-mark information may serve as a proxy for a wholesale market quote before any markup by dealers, as known in the art. Legal Entity Identifier (LEI) information may include, for example, unique identifier information that is assigned to each counterparty of a swap transaction. Unique Swap Identifier (USI) information may include, for example, unique identifier information that is assigned to each swap transaction entered into by counterparties.

In one exemplary embodiment, the SEP compliant swaps trading platform 204 may exhibit certain characteristics affecting how trades are executed in order to comply with the governing regulatory scheme. In such an exemplary embodiment, the SEP compliant swaps trading platform 204 must conform to one or more of the following market structures: (1) Request-for-Quote (RPQ) and/or (2) Orderbook. Trades invoked through RPQ may also conform to a regulatory rule specifying a minimum Liquidity Providers (LP's) that must be asked to place a marketable quote back to the taker. Additionally, all non-exempt SEP trades must be cleared through a Derivatives Clearing Organization (DCO) following steps to assure counterparties engaging in the transaction are credit worthy to consummate the deal. In addition, as it relates to clearing and reporting requirements, the SEP compliant swaps trading platform 204 may be configured to clear each swap trade with a DCO and generate SDR information 218 for submission to a Swaps Data Repository (SDR), as discussed in additional detail below.

As noted above, the apparatus 200 also includes a communications module 208. The communications module 208 may be implemented as any suitable transceiver (including all necessary hardware and software) for transmitting and receiving (i.e., "communicating") information over one or more wired or wireless networks 218 as known in the art. The communications module 208 may be configured to (i) establish one or more communications channels with respective one or more clearinghouses 210 for transmission of clearinghouse information 212 concerning one or more trade requests 222 and/or (ii) establish one or more communications channels with respective one or more SDR providers 216 for transmission of SDR information 218 concerning the one or more trade requests 222.

The clearinghouse information 212 may include information such as, but not limited to, information reflecting (i) the executed price of a swap; (ii) the executed time of a swap; (iii) the counterparties to the swap (e.g., LEI information for each of the counterparties to a given swap); and/or (iv) the credit-worthiness of the counterparties to the swap. The SDR information 218 may include information such as, but not limited to, information reflecting: (i) the executed price of a swap; (ii) the executed time of a swap; the counterparties to the swap (e.g., LEI information for each of the counterparties to a given swap); and/or (iv) any additional information including, but not limited to, information mandated by, for example, Parts 43/45 of the U.S. Commodity Futures Trading Commission's Regulations.

In this manner, the apparatus 200 is configured to (i) generate a SEP-complaint swaps trading platform (e.g., SEP compliant swaps trading platform 204) and establish communication channels with clearinghouse(s) 210 and SDR provider(s) 216 to ensure that all trades executed on the generated SEP-complaint swaps trading platform 204 are cleared and reported in line with applicable regulations.

In one exemplary embodiment, the apparatus 200 includes a generated SEP compliant swaps trading platform 204 (that has been generated by, for example, the swaps trading platform generation module 202 in line with the preceding discussion). Although shown as part of the apparatus 200, those having ordinary skill in the art will recognize that the generated SEP compliant swaps trading platform 204 may also suitably exist remotely to the apparatus 200. For example, in one embodiment, the generated SEP compliant swaps trading platform 204 may exist as a webpage accessible by, for example, user(s) 226 over the one or more networks 228, such as the internet. Nonetheless, the generated SEP compliant swaps trading platform 204 may include a trade execution module 220 and/or a non-SEP complaint portal 224.

In operation, the generated SEP compliant swaps trading platform 204 may function as follows. Once generated, user(s) 226 may access the generated SEP compliant swaps trading platform 204 in order to execute trades, such as those types of trades requiring execution on a SEP complaint platform (e.g., NDFs, foreign exchange options, etc.) in line with regulatory requirements. Thus, the trade execution module 220 of the generated SEP compliant swaps trading platform 204 is configured to: (i) obtain one or more trade requests 222 from the one or more users 226 and/or (ii) execute the one or more trade requests 222 in accordance with the plurality of predefined rules associated with the SEP requirements 206.

Upon execution of the one or more trade requests 222 by the trade execution module 220, the SEP compliant swaps trading platform 204 is configured to transmit: (i) clearinghouse information 212 concerning the one or more executed trade requests and/or (ii) SRD information concerning the one or more executed trade requests to the communications module 208 via, for example, one or more buses or other wired or wireless communication channels known to those having ordinary skill in the art. The communications module 208 may then transmit the clearinghouse information 212 and/or SDRR information to the one or more clearinghouses 210 and/or the one or more SDR providers 216 via the network(s) in order to satisfy the regulatory clearing and reporting requirements associated with SEP complaint platforms. With regard to the SDR provider(s) 216, it is noted that each SDR provider may include a swaps data repository 230 for storing SDR information 218 concerning trade requests executed on the SEP complaint swaps trading platform 204. As known in the art, a "swaps data repository" (SDR) is a repository (e.g., a data warehouse) created by the Dodd-Frank Act in order to provide a central facility for swaps data reporting and recordkeeping. As known in the art, swaps data repositories are required to comply with data standards set by the Commodity Futures Trading Commission (CFTC), including real-time public reporting of swap transaction data to a "disseminator," such as a derivatives clearing organization or a swap execution facility.

In one exemplary embodiment, as part of generating the SEP compliant swaps trading platform 204, the swaps trading platform generation module 202 is configured to embed a selectable non-SEP compliant portal 224 in the SEP compliant swaps trading platform 204. The non-SEP compliant portal 224 may include, but is not limited to, a selectable user-interface element, such as a radio button or hyperlink, that allows user(s) 226 to switch from the SEP compliant swaps trading platform 204 to a non-SEP complaint trading platform.

For example, in line with the above teachings, in one embodiment, user(s) 226 may access the generated SEP compliant swaps trading platform 204 (e.g., via the network (s) 228) in order to execute trades requiring execution on a SEP compliant platform (pursuant to regulations). For example, in this embodiment, the generated SEP compliant swaps trading platform 204 may be presented to user(s) 226 as a webpage viewable through a display device (e.g., a monitor, touch screen, etc.) of the user(s) computing devices (e.g., PCs, smart phones, PDAs, cellular phones, tablets, etc.). In such a scenario, the user(s) 226 may wish to transfer from the generated SEP compliant swaps trading platform 204 to a traditional platform (i.e., non-SEP compliant swaps trading platform) for evaluating and/or executing trades that are not required to be executed through a SEP compliant platform. In order to provide for the transitioning between a SEP complaint swaps trading platform (e.g., platform 204) and a non-SEP complaint swaps trading platform (not shown in FIG. 2), the SEP complaint swaps trading platform 204 of the apparatus 200 may include the non-SEP compliant portal 224.

Continuing with this example, the user(s) 226 may indicate a desire to transition from the SEP complaint swaps trading platform 204 to the non-SEP complaint swaps trading platform by selecting the non-SEP complaint portal 224. The selection may be accomplished by the user(s) 226 in any number of suitable ways including, but not limited to, moving a mouse pointer over the non-SEP complaint portal user-interface element (as displayed, for example on the webpage in an embodiment where the generated SEP-complaint swaps trading platform 204 is implemented as a webpage) and depressing the mouse key (e.g., left-clicking the mouse on a two-button mouse). In an embodiment where the user(s) are using a computing device including a touch screen to communicate with apparatus the 200 over the network(s), the selection of the non-SEP compliant portal 224 may be accomplished by the user(s) pressing their finger on the portion of the touch screen displaying the non-SEP compliant portal 224 user interface element.

Upon selection of the non-SEP compliant portal 224, the apparatus 200 is configured to generate a non-SEP compliant swaps trading platform interface in place of, or in addition to, the generated SEP-complaint swaps trading platform 204. For example, in one embodiment where the generated SEP complaint swaps trading platform 204 is implemented as a user interface displayed as part of a webpage, upon selecting the non-SEP complaint portal 224 from the generated SEP complaint swaps trading platform 204, the webpage updates to display a non-SEP compliant swaps trading platform configured to allow for the evaluation and execution of trades that are not required to be traded on a SEP compliant swaps trading platform. In another embodiment where the generated SEP complaint swaps trading platform 204 is implemented as a user interface displayed as part of a webpage, upon selecting the non-SEP complaint portal 224 from the generated SEP complaint swaps trading platform 204, a new webbrowser window (e.g., a "pop-up" window) is generated, wherein the new web browser window displays a webpage including a user interface implementing a non-SEP compliant swaps trading platform. In this manner, user(s) 226 may easily and seamlessly transition from the generated SEP complaint swaps trading platform 204 to a non-SEP compliant swaps trading platform.

Figure 3:
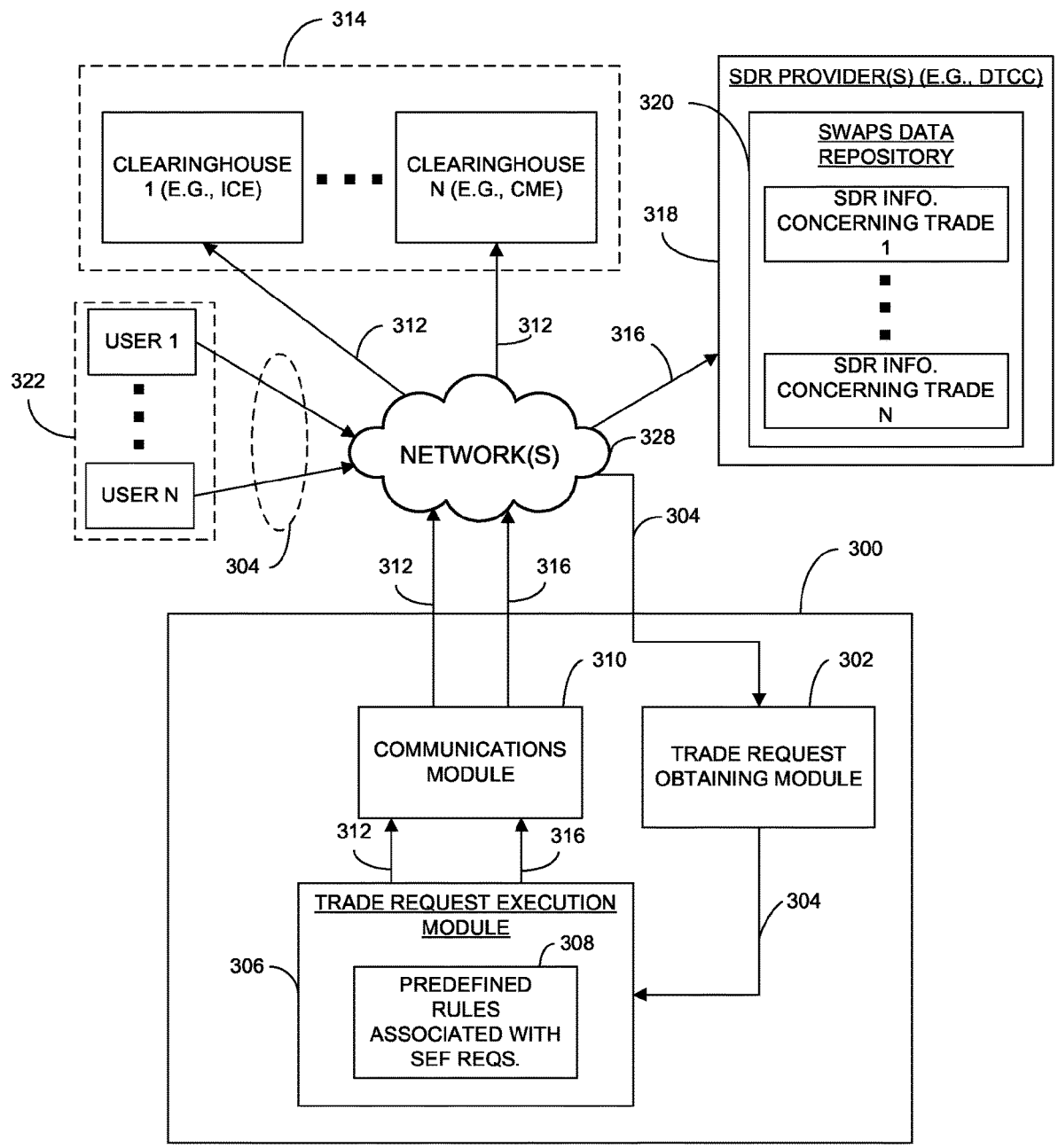
FIG. 3 is a block diagram illustrating one example of an apparatus suitable for use in operating a SEP compliant swaps trading platform within a network environment.

Referring now to FIG. 3, a block diagram illustrating one example of an apparatus 300 suitable for use in operating a SEP compliant swaps trading platform within a network environment is provided. The apparatus 300 may be implemented by, for example, by the computing device 100 described above, or using other suitable computing techniques and components known to those having ordinary skill in the art.

As shown, the apparatus 300 may include a trade request obtaining module 302, a trade request execution module 306 operatively connected to the trade request obtaining module 302, and a communications module 310 operatively connected to the trade request execution module 306. Furthermore, the apparatus 300 may be communicatively coupled to one or more of the following over one or more suitable wired or wireless networks 328 (e.g., the Internet): (i) one or more users 322; (ii) one or more clearinghouses 314; and/or (iii) one or more swaps data repository (SDR) providers 318. The one or more users 322 may include, for example, banks, brokers, asset managers, hedge funds, individual investors, or any other person or entity interested in trading the types of financial instruments requiring execution in a SEP under the Dodd-Frank regulatory scheme. The one or more clearinghouses 314 may include, but are not limited to, (i) one or more clearinghouses operated by the Intercontinental Exchange Group, Inc. (ICE), (ii) one or more clearinghouses operated by the Chicago Mercantile Exchange (CME), and/or (iii) any other suitable clearinghouse(s) known to those having ordinary skill in the art. The one or more SDR providers 318 may include, but are not limited to, The Depository Trust & Clearing Corporation (DTCC), or any other suitable swaps data repository provider known to those having ordinary skill in the art.

In operation, the apparatus 300 may function as follows. The trade request obtaining module 302 of the apparatus 300 is configured to obtain one or more trade requests 304 concerning respective one or more trade types requiring execution in a swaps execution facility (SEP). For example, in one embodiment, the one or more trade requests 304 are NDFs and/or foreign exchange options. The trade request(s) 304 may be obtained, for example, from the one or more users 322 via the network(s) 328 using techniques well-known in the art. As used herein, "obtaining" may include receiving the one or more trade requests 304 from the one or more users 322 or fetching the one or more trade requests from the one or more users 322 (e.g., retrieving data from the user(s) computing device indicative of the trade request(s) 304).

After being obtained from the user(s) 322, the one or more trade requests 304 may be provided to the trade request execution module 308 of the apparatus 300. The trade request execution module 308 is configured to execute the one or more trade requests in accordance with a plurality of predefined rules associated with SEP requirements 308 using trade execution techniques known in the art. Further, the predefined rules associated with SEP requirements 308 shown in FIG. 3 may be the same as, or different than, the predefined rules associated with SEP requirements 206 discussed above with regard to FIG. 2.

After executing the one or more trade requests 304, the trade request execution module may provide clearinghouse information 312 and/or SDR information 316 concerning the executed one or more trade requests 304 to the communication module 310. The communication module 310 is configured to operate substantially in line with the communications module 208 described above with regard to FIG. 2. Further, the clearinghouse information 312 and/or SDR information 316 shown in FIG. 3 may be the same type or types of information described above with regard to clearinghouse information 312 and SDR information 218. In any event, the communications module 310 of apparatus 300 is configured to communicate the clearinghouse information 312 regarding the executed one or more trade requests 312 to one or more clearinghouses 314 via network(s) 328. Similarly, the communications module 310 is configured to communicate the SDR information 316 to one or more SDR providers 318 via network(s) 328. As with the SDR provider(s) 216 discussed with regard to FIG. 2 above, the SDR provider(s) 318 may each include a swaps data repository 320 for storing the SDR information 316 concerning the one or more executed trade requests. In this manner, apparatus 300 allows user(s) 322 to execute trade request(s) 304 using a SEP compliant platform so as to comply with existing regulations.

Figure 4:
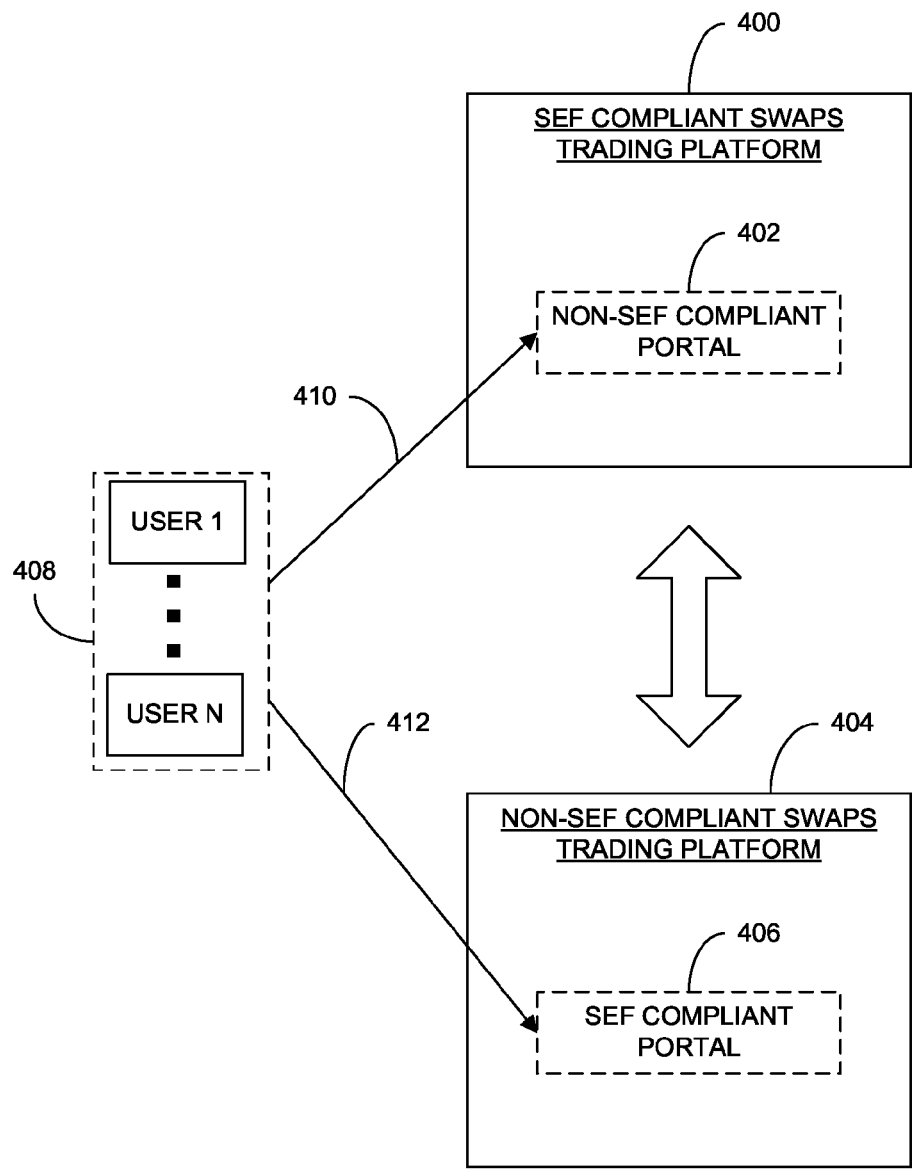
FIG. 4 is a block diagram illustrating a method for transitioning between a SEP compliant swaps trading platform and a non-SEP compliant swaps trading platform through the use of selectable portals.

Referring now to FIG. 4, a block diagram illustrating a method and related components for transitioning between a SEP compliant swaps trading platform 400 and a non-SEP compliant swaps trading platform 404 through the use of selectable portals 402, 406 is provided. As shown, a non-SEP compliant portal 402 has been embedded in the SEP complaint swaps trading platform 400. For a discussion on embedding a non-SEP compliant portal 402 within a SEP complaint swaps trading platform 400, please refer to the above discussion concerning FIG. 2. Similarly, and as also shown in FIG. 4, a SEP compliant portal 406 has been embedded in a non-SEP compliant swaps trading platform 404. The SEP compliant portal 406 may be embedded in the non-SEP compliant swaps trading platform 404 using substantially the same techniques described above with regard to embedding a non-SEP compliant portal (e.g., non-SEP compliant portal 224) in a SEP compliant swaps trading platform (e.g., SEP compliant swaps trading platform 204), as will be appreciated by those having ordinary skill in the art.

As illustrated by FIG. 4, one or more users 408 may access the SEP compliant swaps trading platform 400 and the non-SEP compliant swaps trading platform 404 via, for example, one or more networks (not shown). For example, in one embodiment, both the SEP compliant swaps trading platform 400 and the non-SEP compliant swaps trading platform 404 may be implemented as user interfaces on one or more webpages accessible by the user(s) 408 via the Internet.

In a first example, a given user may be viewing and/or interacting with the SEP compliant swaps trading platform 400 and decide that they want to switch to a non-SEP compliant swaps trading platform 404 (e.g., in order to trade financial instruments that are not required to be traded via a SEP). Accordingly, the given user may select the non-SEP complaint portal 402 from the SEP compliant swaps trading platform 400. Selection of the non-SEP complaint portal 402 may be accomplished substantially in line with the discussion above with regard to FIG. 2. Upon selection of the non-SEP complaint portal 402, the user will be transitioned from the SEP compliant swaps trading platform 400 to the non-SEP compliant swaps trading platform 404. This transition may be accomplished substantially in line with the discussion above concerning FIG. 2.

In a second example, a given user may be viewing and/or interacting with the non-SEP compliant swaps trading platform 404 and decide that they want to switch to a SEP compliant swaps trading platform 400 (e.g., in order to trade financial instruments that are required to be traded via a SEP). Accordingly, the given user may select the SEP complaint portal 406 from the non-SEP compliant swaps trading platform 404. Selection of the SEP complaint portal 406 may be accomplished substantially in line with the selection of the non-SEP compliant portal (e.g., non-SEP compliant portal 224) discussed above with regard to FIG. 2. Upon selection of the SEP complaint portal 406, the user will be transitioned from the non-SEP compliant swaps trading platform 404 to the SEP compliant swaps trading platform 400. In this manner, the one or more users 408 may readily switch back and forth in a seamless manner between a SEP compliant swaps trading platform 400 and a non-SEP compliant swaps trading platform 404 in order to meet their trading needs and comply with pertinent regulations.

Figure 5:
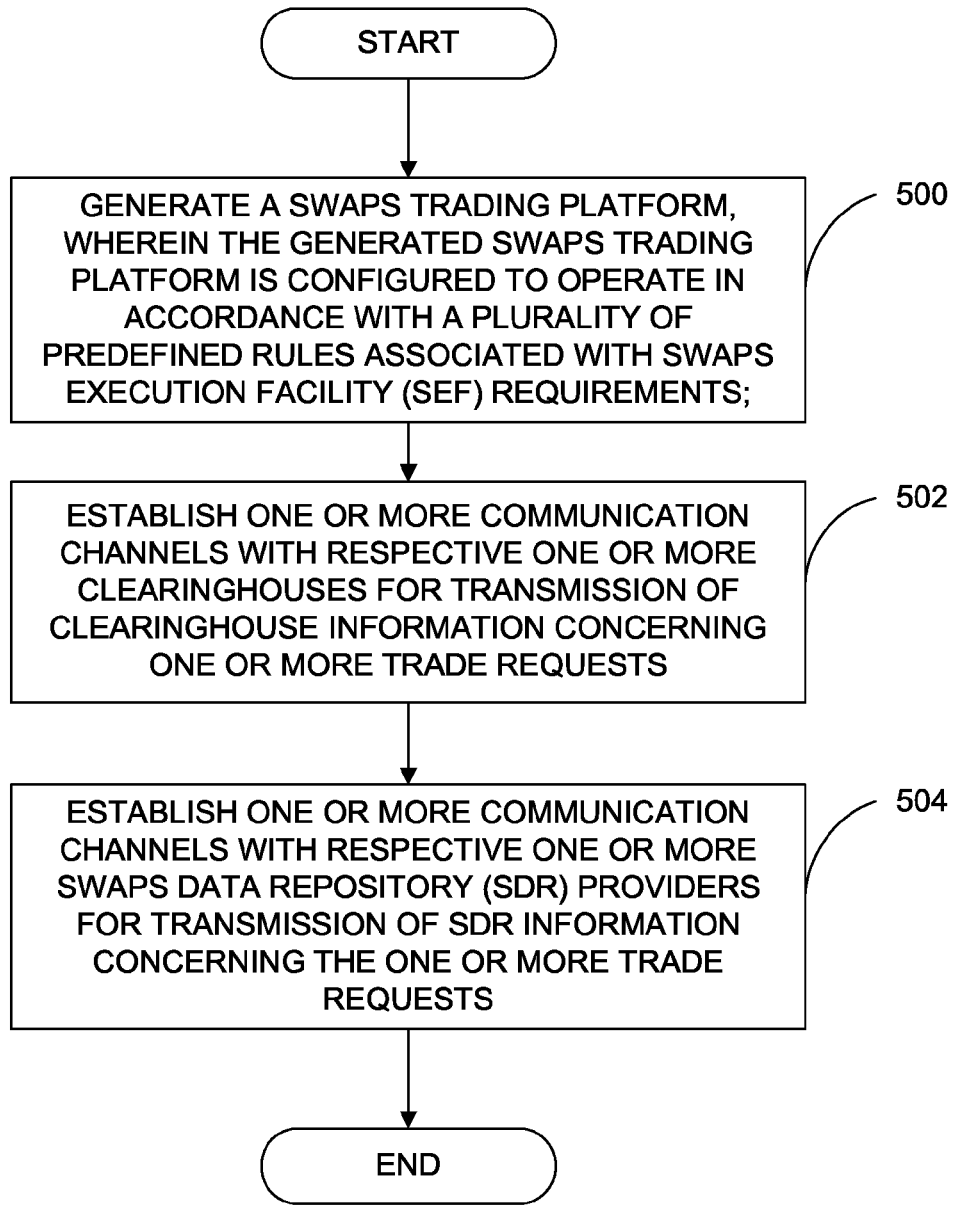
FIG. 5 is a flowchart diagram illustrating one example of a method for generating a SEP compliant swaps trading platform in accordance with the instant disclosure.

Referring now to FIG. 5, a flowchart diagram illustrating one example of a method for generating a SEP compliant swaps trading platform in accordance with the instant disclosure is provided. At step 500, a swaps trading platform is generated. The generated swaps trading platform is configured to operate in accordance with a plurality of predefined rules associated with swaps execution facility (SEP) requirements. At step 502, one or more communication channels are established with respective one or more clearinghouses for the transmission of clearinghouse information concerning one or more trade requests. Finally, at step 504, one or more communication channels are established with respective one or more swaps data repository (SDR) providers for the transmission of SDR information concerning the one or more trade requests.

Figure 6:
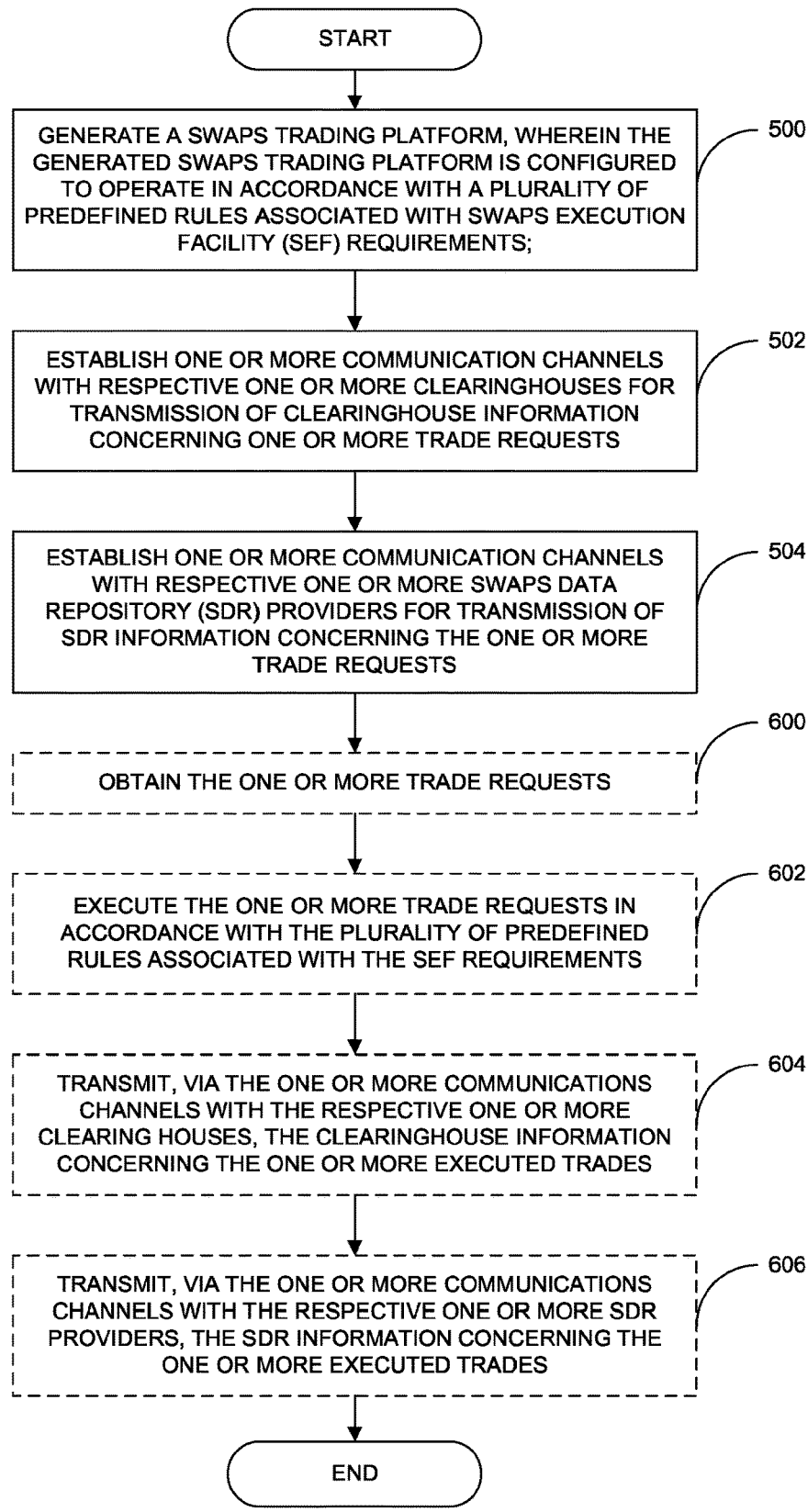
FIG. 6 is a flowchart diagram illustrating one example of a method for generating and operating a SEP compliant swaps trading platform in accordance with the instant disclosure.

Referring now to FIG. 6, a flowchart diagram illustrating one example of a method for generating and operating a SEP compliant swaps trading platform in accordance with the instant disclosure is provided. Steps 500-504 are carried out in accordance with the discussion of those steps provided above with regard to FIG. 5. At step 600, the one or more trade requests are obtained. At step 602, the one or more trade requests are executed in accordance with the plurality of predefined rules associated with the SEP requirements. At step 604, clearinghouse information concerning the one or more executed trades is transmitted with one or more clearinghouses via one or more communication channels. At step 606, SDR information concerning the one or more executed trades is transmitted with one or more SDR providers via one or more communication channels.

Figure 7:
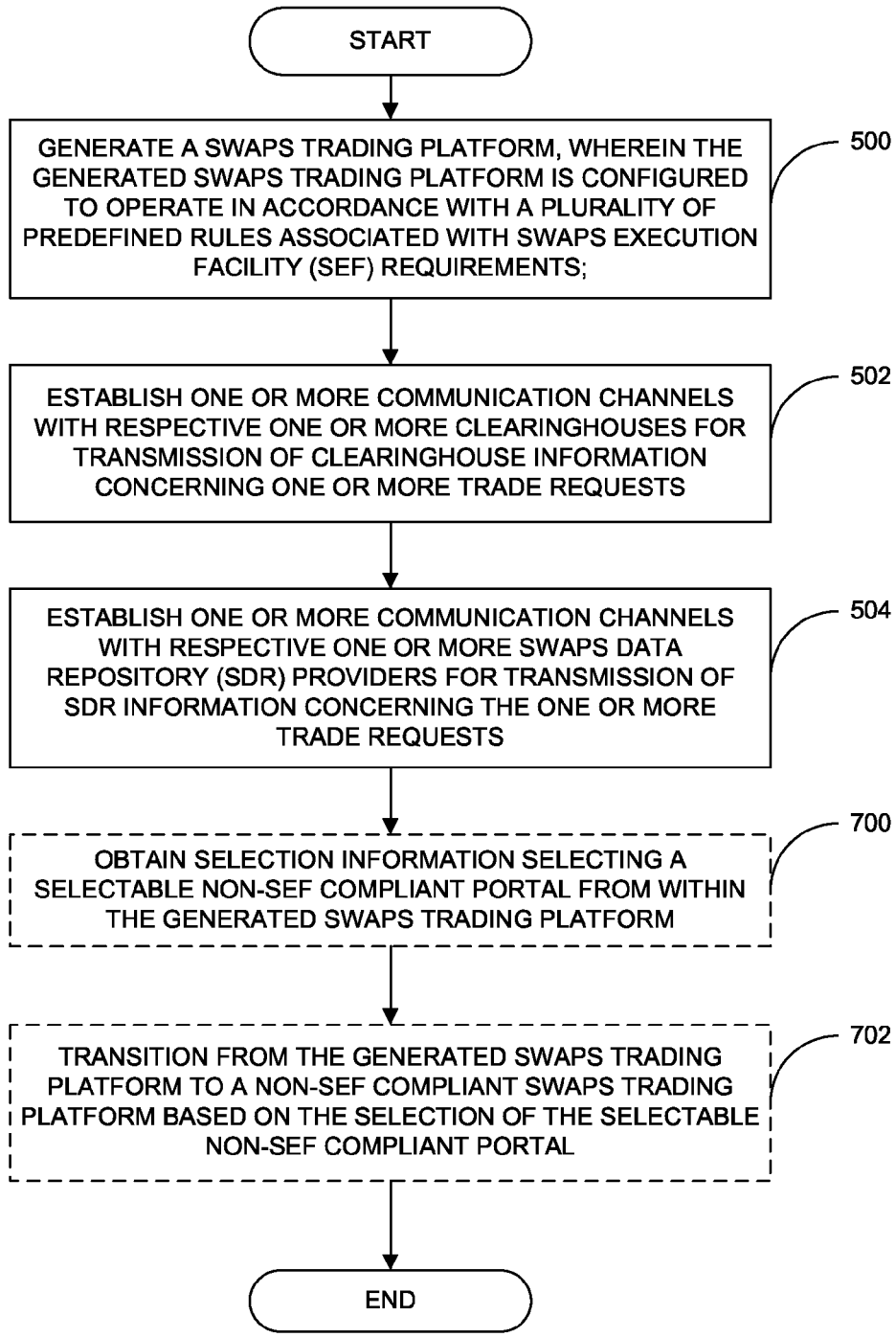
FIG. 7 is a flowchart diagram illustrating one example of a method for generating a SEP compliant swaps trading platform and transitioning from the generated SEP-complaint swaps trading to a non-SEP compliant swaps trading platform in accordance with the instant disclosure.

Referring now to FIG. 7, a flowchart diagram illustrating another example of a method for generating and operating a SEP compliant swaps trading platform in accordance with the instant disclosure 1 s provided. Steps 500-504 are carried out in accordance with the discussion of those steps provided above with regard to FIG. 5. At step 700, selection information selecting a selectable non-SEP compliant portal from within the generated swaps trading platform is obtained. At step 702, a transition is accomplished from the generated swaps trading platform to a non-SEP compliant swaps trading platform based on the selection of the selectable non-SEP compliant portal.

Figure 8:
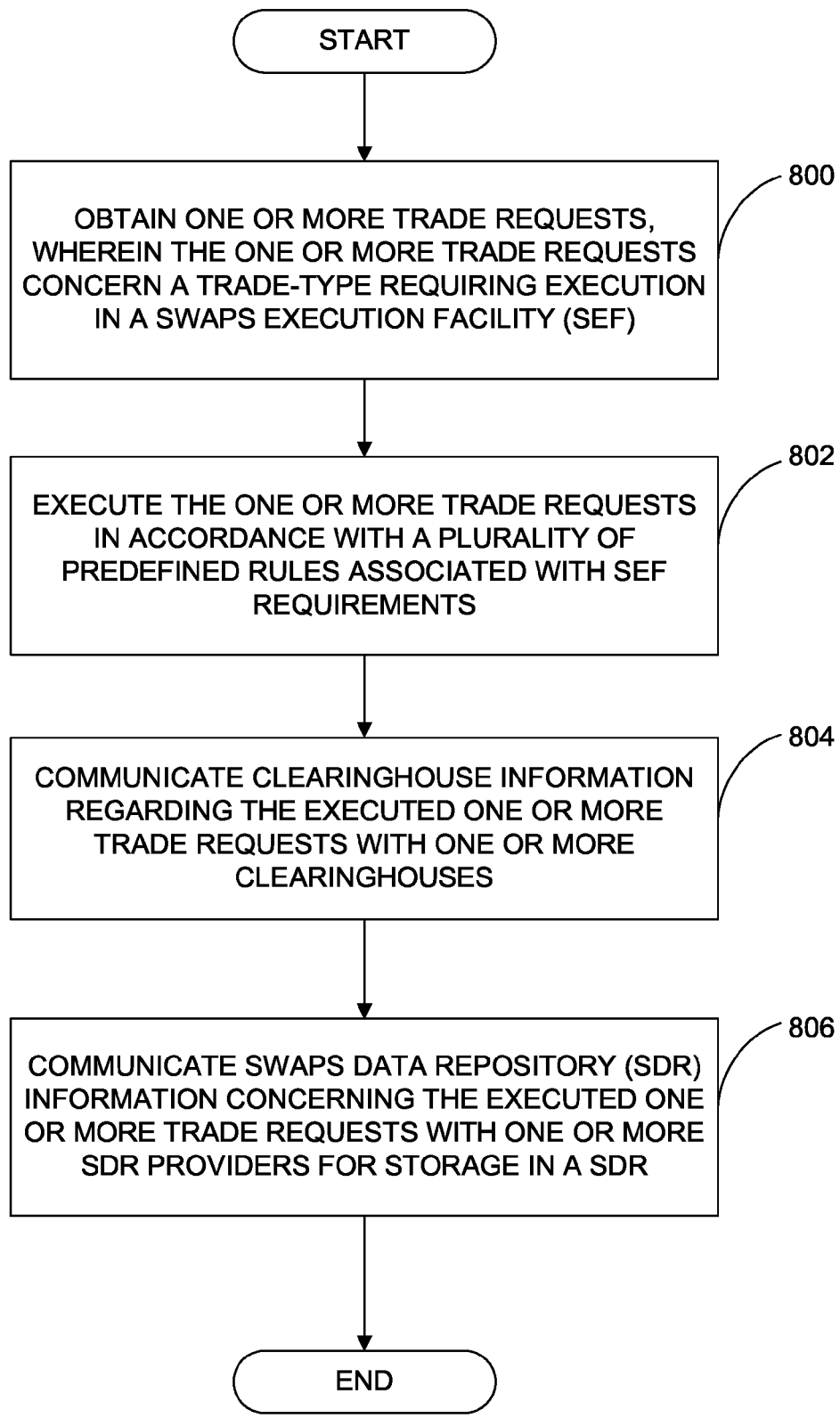
FIG. 8 is a flowchart diagram illustrating one example of a method for operating a SEP compliant swaps trading platform in accordance with the instant disclosure.

Referring now to FIG. 8, a flowchart diagram illustrating one example of a method for operating a SEP compliant swaps trading platform in accordance with the instant disclosure is provided. At step 800, one or more trade requests are obtained. The one or more trade requests concern a trade-type requiring execution in a swaps execution facility (SEP). At step 802, the one or more trade requests are executed in accordance with a plurality of predefined rules associated with SEP requirements. At step 804, clearinghouse information regarding the executed one or more trade requests are communicated with one or more clearinghouses. At step 806, swaps data repository (SDR) information concerning the executed one or more trade requests are communicated with one or more SDR providers for storage in a SDR.

Figure 9:
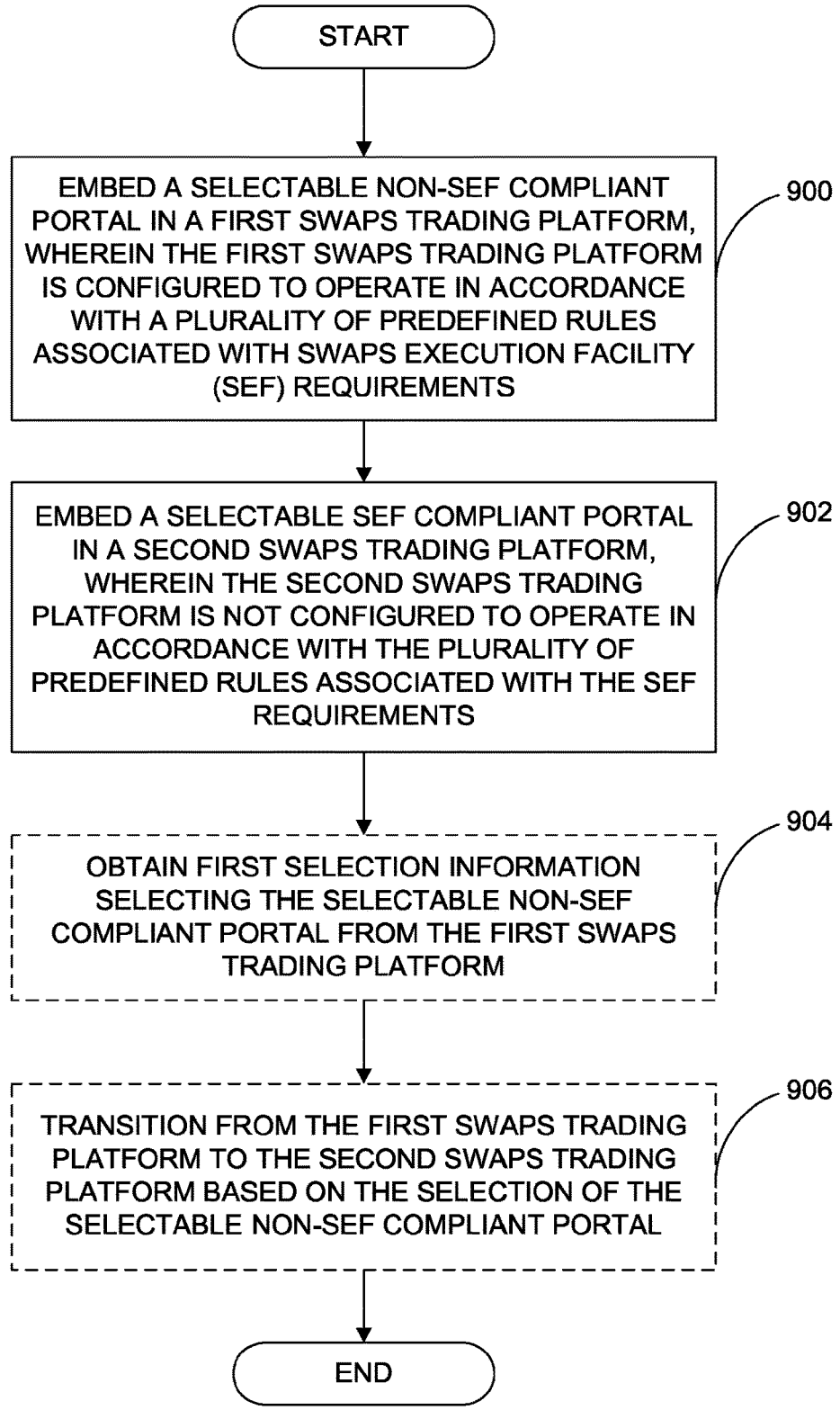
FIG. 9 is a flowchart diagram illustrating one example of a method for embedding portals in a SEP compliant swaps trading platform and a non-SEP compliant swaps trading platform to permit transitioning from the SEP compliant swaps trading platform to the non-SEP compliant swaps trading platform, and vice versa.

Referring now to FIG. 9, a flowchart diagram illustrating one example of a method for embedding portals in a SEP compliant swaps trading platform and a non-SEP compliant swaps trading platform to permit transitioning from the SEP compliant swaps trading platform to the non-SEP compliant swaps trading platform, and vice versa, is provided. At step 900, a selectable non-SEP compliant portal is embedded in a first swaps trading platform. The first swaps trading platform is configured to operate in accordance with a plurality of predefined rules associated with swaps execution facility (SEP) requirements. At step 902, a selectable SEP compliant portal is embedded in a second swaps trading platform. The second swaps trading platform is not configured to operate in accordance with the plurality of predefined rules associated with the SEP requirements. At step 904, first selection information is obtained. The first selection information includes information selecting the selectable non-SEP compliant portal from the first swaps trading platform. At step 906, a transition is accomplished from the first swaps trading platform to the second swaps trading platform based on the selection of the selectable non-SEP compliant portal.

Figure 10:
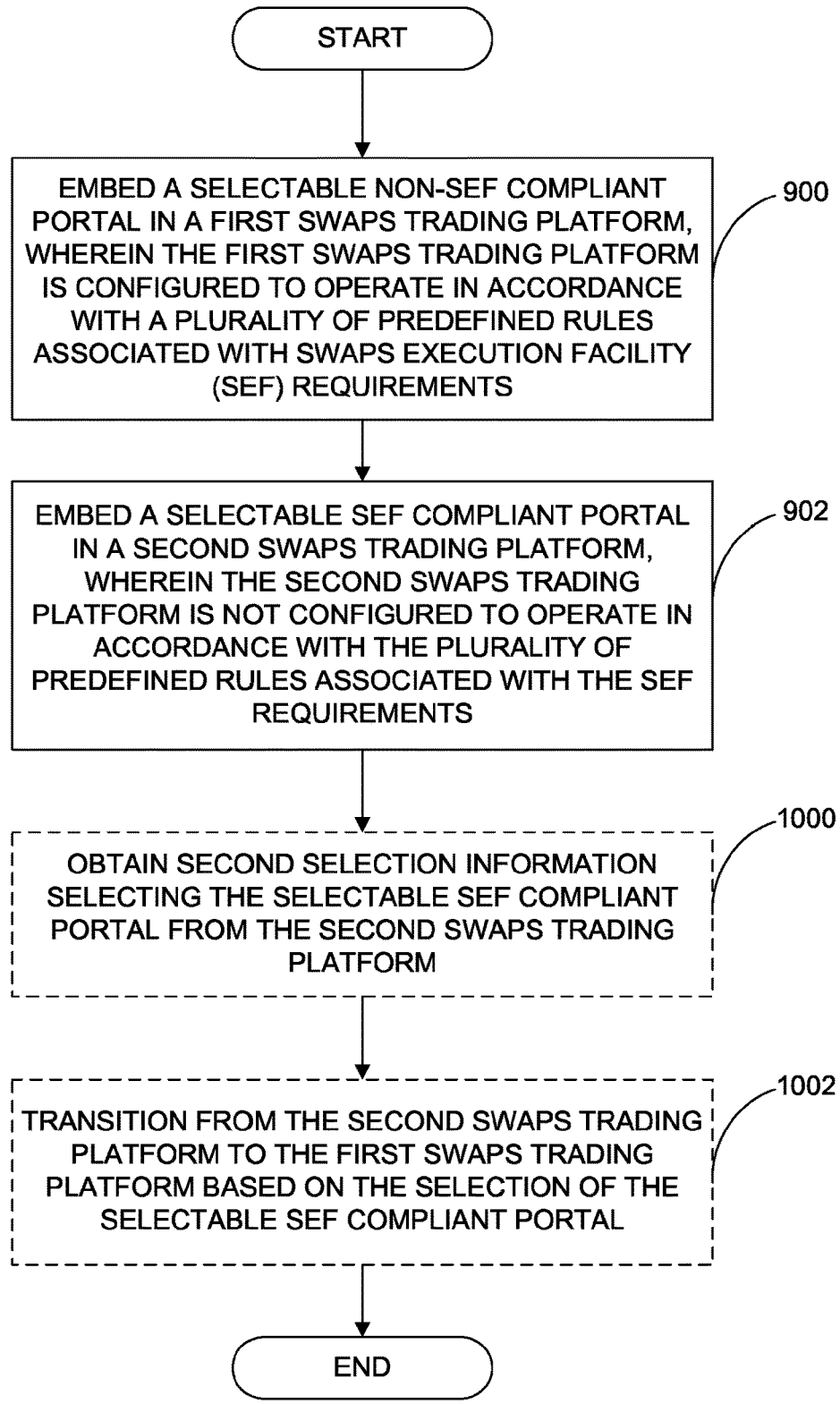
FIG. 10 is a flowchart diagram illustrating another example of a method for embedding portals in a SEP compliant swaps trading platform and a non-SEP compliant swaps trading platform to permit transitioning from the SEP compliant swaps trading platform to the non-SEP compliant swaps trading platform, and vice versa.

Referring now to FIG. 10, a flowchart diagram illustrating another example of a method for embedding portals in a SEP compliant swaps trading platform and a non-SEF compliant swaps trading platform to permit transitioning from the SEP compliant swaps trading platform to the non-SEP compliant swaps trading platform, and vice versa, is provided. Steps 900-902 are carried out in accordance with the discussion of those steps provided above with regard to FIG. 9. At step 1000, second selection information is obtained. The second selection information includes information selecting the selectable SEP compliant portal from the second swaps trading platform. At step 1002, a transition is accomplished from the second swaps trading platform to the first swaps trading platform based on the selection of the selectable SEP compliant portal.

Figure 11A:
FIG. 11a is one example of a graphical user interface (GUI) associated with a SEP complaint swaps trading platform, wherein the GUI includes an embedded portal to permit transitioning from the SEP compliant swaps trading platform to a non-SEP compliant swaps trading platform.

Referring now to FIG. 11a, one example of a graphical user interface (GUI) associated with a SEP complaint swaps trading platform is provided. In the illustrated example, the GUI includes an embedded portal 1100 to permit transitioning from the SEP compliant swaps trading platform to a non-SEP compliant swaps trading platform in accordance with the preceding teachings of this disclosure.

Figure 11B:
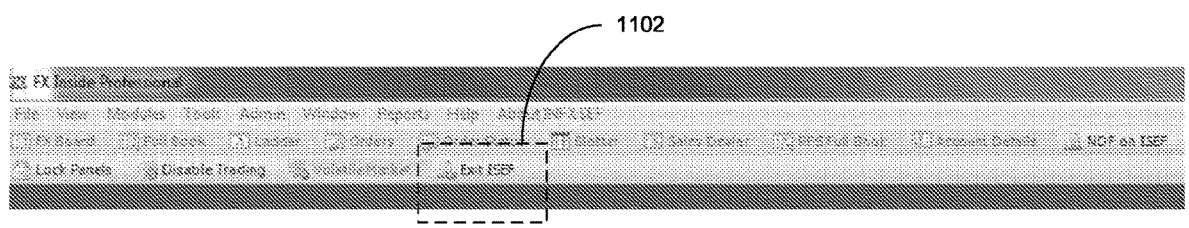
FIG. 11b is one example of a graphical user interface (GUI) associated with a non-SEP complaint swaps trading platform, wherein the GUI includes an embedded portal to permit transitioning from the non-SEP compliant swaps trading platform to a SEP compliant swaps trading platform.

Referring now to FIG. 11b, one example of a GUI associated with a non-SEP complaint swaps trading platform is provided. In the illustrated example, the GUI includes an embedded portal 1102 to permit transitioning from the non-SEP compliant swaps trading platform to a SEP compliant swaps trading platform in accordance with the preceding teachings of this disclosure.

As used in this application, the terms "component," "module," "system" and the like are intended to include a computer-related entity, such as but not limited to hardware, firmware, a combination of hardware and software, software, or software m execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments of this technology are described above with reference to block and flow diagrams of computing devices and methods and/or computer program products according to example embodiments of the disclosure. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments of this disclosure may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:
    embedding, by a processor, a selectable non-swaps execution facility (non-SEF) compliant portal in a first swaps trading platform, wherein the first swaps trading platform is configured to be SEF compliant by operating in accordance with a plurality of rules associated with a swaps execution facility;
    embedding, by the processor, a selectable SEF compliant portal in a second swaps trading platform, wherein the second swaps trading platform:
        is different than the first swaps trading platform, and
        is non-SEF compliant, wherein the non-SEF compliant platform is not configured to operate in accordance with the plurality of rules associated with the swaps execution facility;
    obtaining first selection information indicating a selection of the embedded selectable non-SEF compliant portal; and
    transitioning, by the processor and based on the selection of the embedded selectable non-SEF compliant portal, from the first swaps trading platform to the second swaps trading platform by causing, on a display device, a graphical user interface (GUI) to be updated to display the second swaps trading platform.

2. The computer-implemented method of claim 1, further comprising:
    obtaining, by the processor, second selection information indicating a selection of the embedded selectable SEF compliant portal from the second swaps trading platform; and
    transitioning, by the processor and based on the selection of the embedded selectable SEF compliant portal, from the second swaps trading platform to the first swaps trading platform, wherein the GUI is updated to display the first swaps trading platform.

3. The computer-implemented method of claim 1, wherein the plurality of rules associated with a swaps execution facility are associated with at least one of the following:
    market snapshot at execution;
    mid-mark;
    counterparty legal entity identifier (LEI); or
    unique Swap identifier (USI).

4. The computer-implemented method of claim 1, further comprising:
    establishing, by the processor, one or more communications channels between the first swaps trading platform and respective one or more clearinghouses for transmission of clearinghouse information concerning one or more trade requests; and
    establishing, by the processor, one or more communications channels between the first swaps trading platform and respective one or more swaps data repository (SDR) providers for transmission of SDR information concerning one or more trade requests.

5. The computer-implemented method of claim 1, further comprising causing, by the processor, the first swaps trading platform to be displayed on a display device via at least one of (i) the GUI, or (ii) a webpage, wherein a first set of trading information is exchanged via the first swaps trading platform.

6. The computer-implemented method of claim 5, wherein a second set of trading information is exchanged via the second swaps trading platform.

7. One or more non-transitory computer-readable media including instructions that, when executed by one or more processors, cause the one or more processors to perform the steps of:
   embedding a selectable non-swaps execution facility (non-SEF) compliant portal in a first swaps trading platform, wherein the first swaps trading platform is configured to be SEF compliant by operating in accordance with a plurality of rules associated with a swaps execution facility;
   embedding a selectable SEF compliant portal in a second swaps trading platform, wherein the second swaps trading platform:
      is different than the first swaps trading platform, and
      is not configured to operate in accordance with the plurality of rules associated with the swaps execution facility;
   obtaining first selection information indicating a selection of the embedded selectable non-SEF compliant portal; and
   transitioning, by the processor and based on the selection of the embedded selectable non-SEF compliant portal, from the first swaps trading platform to the second swaps trading platform by causing, on a display device, a graphical user interface (GUI) to be updated to display the second swaps trading platform.

8. The one or more non-transitory computer-readable media of claim 7, wherein the one or more processors are further caused to perform the steps of:
   obtaining, by the processor, second selection information indicating a selection of the embedded selectable SEF compliant portal from the second swaps trading platform; and
   transitioning, by the processor and based on the selection of the embedded selectable SEF compliant portal, from the second swaps trading platform to the first swaps trading platform, wherein the GUI is updated to display the first swaps trading platform.

9. The one or more non-transitory computer-readable media of claim 7, wherein the plurality of rules associated with a swaps execution facility are associated with at least one of the following:
   market snapshot at execution;
   mid-mark;
   counterparty legal entity identifier (LEI); or
   unique Swap identifier (USI).

10. A system, comprising:
    one or more memories including instructions; and
    one or more processor that are coupled to the one or more memories and, when executing the instructions, are configured to perform the steps of:
       embedding a selectable non-swaps execution facility (non-SEF) compliant portal in a first swaps trading platform, wherein the first swaps trading platform is configured to be SEF compliant by operating in accordance with a plurality of rules associated with a swaps execution facility;
       embedding a selectable SEF compliant portal in a second swaps trading platform, wherein the second swaps trading platform:
          is different than the first swaps trading platform, and
          is not configured to operate in accordance with the plurality of rules associated with the swaps execution facility;
       obtaining information indicating a selection of the embedded selectable non-SEF compliant portal; and
       transitioning, by the processor and based on the selection of the embedded selectable non-SEF compliant portal, from the first swaps trading platform to the second swaps trading platform by causing, on a display device, a graphical user interface (GUI) to be updated to display the second swaps trading platform.

11. The system of claim 10, wherein the one or more processors are further configured to perform the steps of:
    obtaining, by the processor, second selection information indicating a selection of the embedded selectable SEF compliant portal from the second swaps trading platform; and
    transitioning, by the processor and based on the selection of the embedded selectable SEF compliant portal, from the second swaps trading platform to the first swaps trading platform, wherein the GUI is updated to display the first swaps trading platform.

12. The system of claim 10, wherein the plurality of rules associated with a swaps execution facility are associated with at least one of the following:
    market snapshot at execution;
    mid-mark;
    counterparty legal entity identifier (LEI); or
    unique Swap identifier (USI).

* * * * *

UNITED STATES PATENT AND TRADEMARK OFFICE
CERTIFICATE OF CORRECTION

| | |
|---|---|
| PATENT NO. | : 11,443,378 B2 |
| APPLICATION NO. | : 17/065496 |
| DATED | : September 13, 2022 |
| INVENTOR(S) | : Harpal Sandhu, Michelle Yip Chen and Vikas Srivastava |

It is certified that error appears in the above-identified patent and that said Letters Patent is hereby corrected as shown below:

On the Title Page

Item [57]:
Line 2, delete "(SEP)" and insert --(SEF)--;
Line 7, delete "(SEP)" and insert --(SEF)--.

Signed and Sealed this
Thirteenth Day of December, 2022

Katherine Kelly Vidal
*Director of the United States Patent and Trademark Office*